H. D. OPPENHEIMER.
MACHINE FOR CLEANING INTESTINES OR CASINGS.
APPLICATION FILED SEPT. 12, 1910.
1,019,079.
Patented Mar. 5, 1912.
3 SHEETS—SHEET 2.
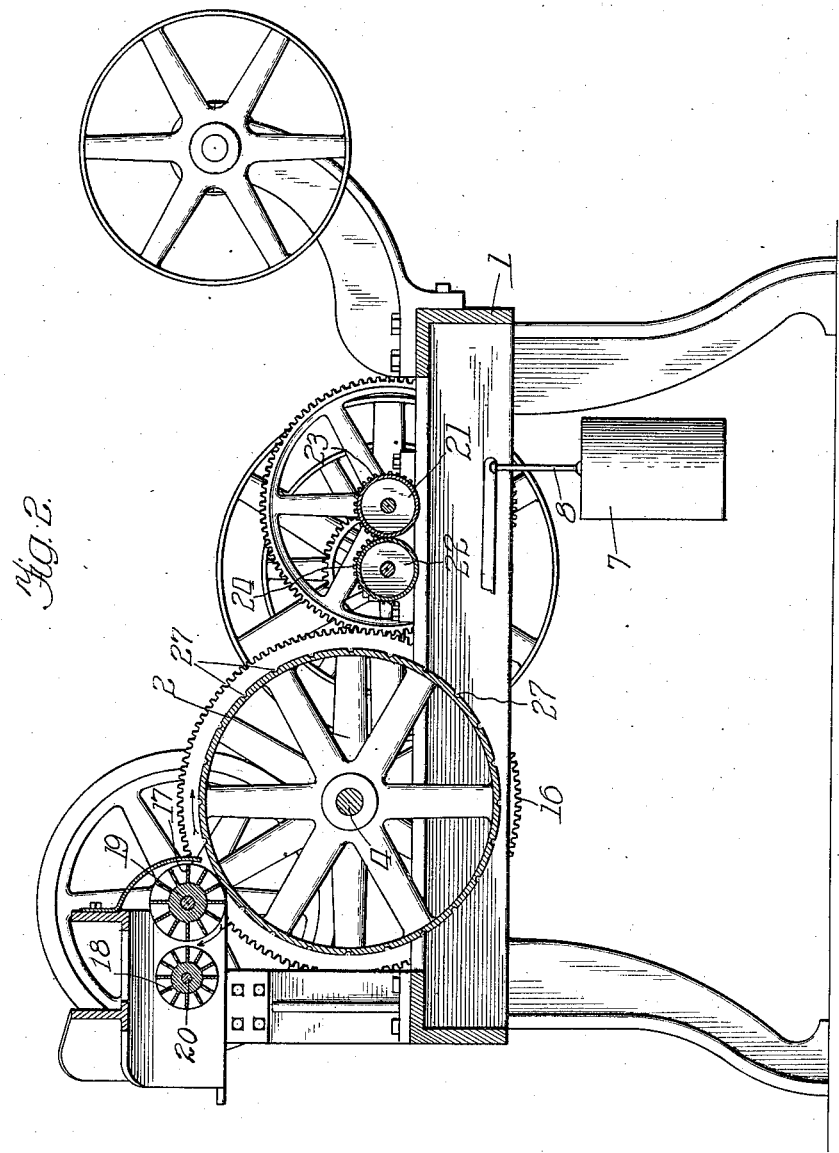

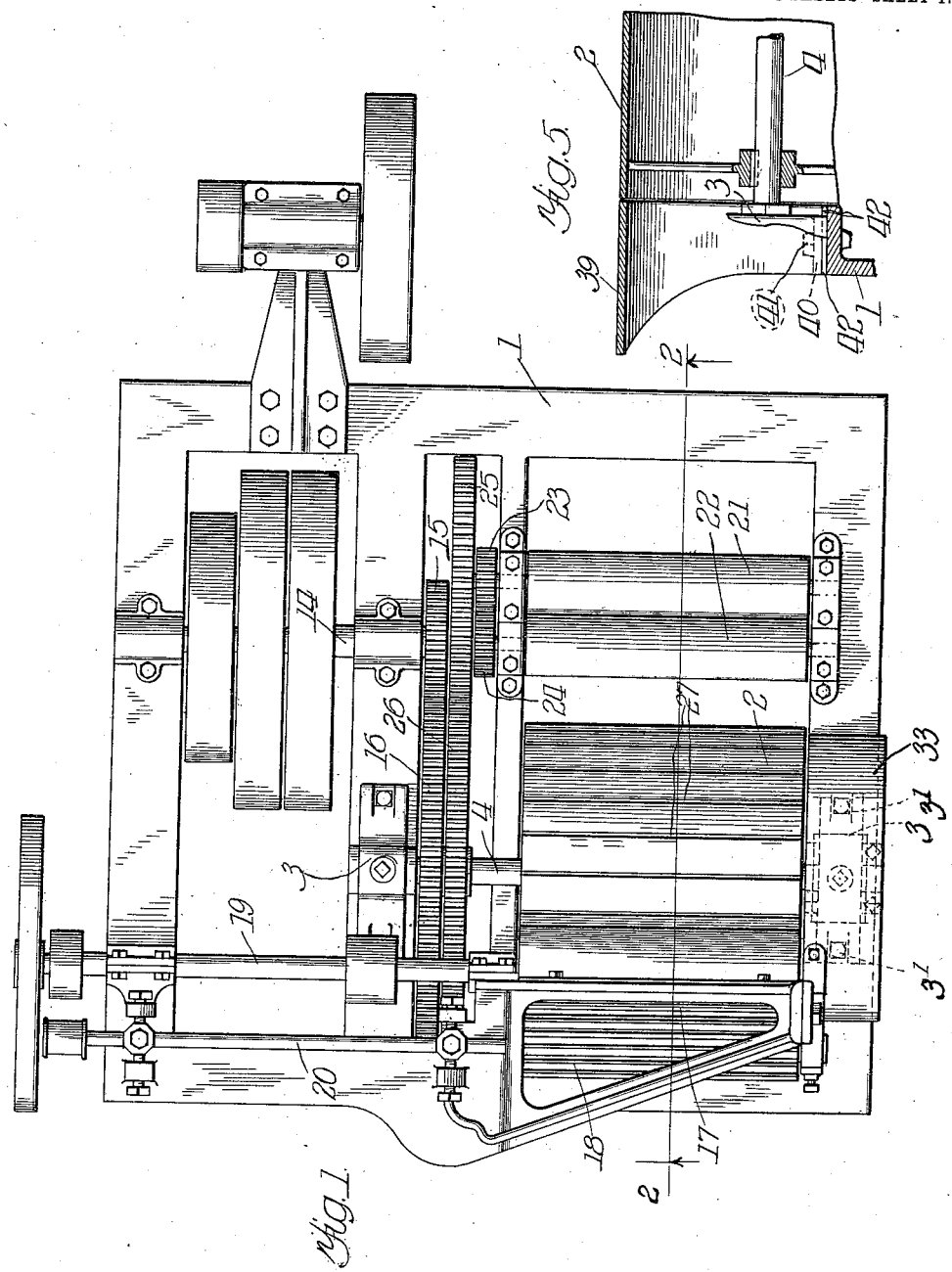

H. D. OPPENHEIMER.
MACHINE FOR CLEANING INTESTINES OR CASINGS.
APPLICATION FILED SEPT. 12, 1910.
1,019,079.
Patented Mar. 5, 1912.
3 SHEETS—SHEET 3.
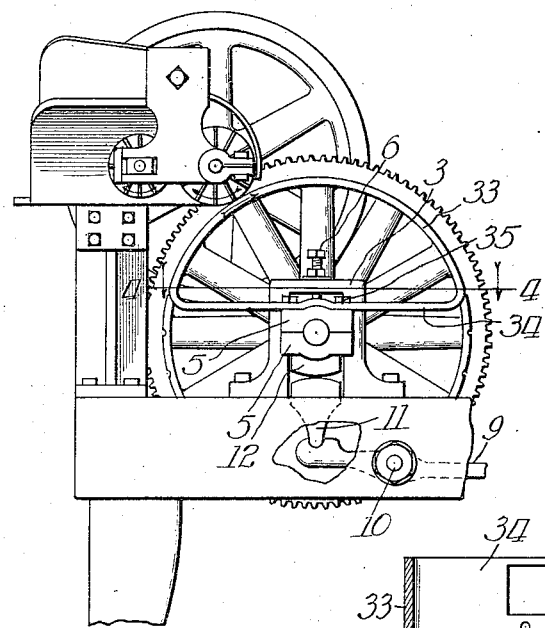
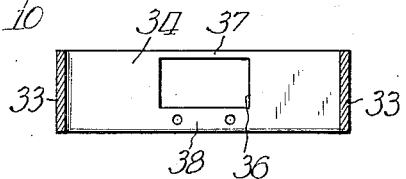
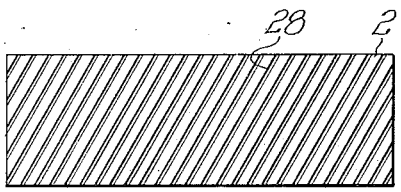
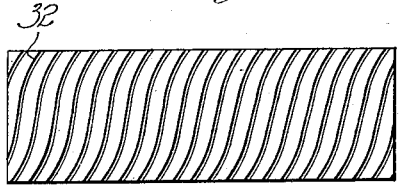

UNITED STATES PATENT OFFICE.

HARRY D. OPPENHEIMER, OF CHICAGO, ILLINOIS.

MACHINE FOR CLEANING INTESTINES OR CASINGS.

1,019,079.  Specification of Letters Patent.  Patented Mar. 5, 1912.

Application filed September 12, 1910. Serial No. 581,655.

*To all whom it may concern:*

Be it known that I, HARRY D. OPPENHEIMER, a citizen of the United States, residing at Chicago, in the county of Cook and State of Illinois, have invented certain new and useful Improvements in Machines for Cleaning Intestines or Casings, of which the following is a description.

My invention belongs to that class of devices known as machines for cleaning or scraping intestines in the preparation of casings, and has among its objects the production of a more efficient, improved and satisfactory device of the kind described, for use wherever found applicable.

To this end my invention consists in the novel construction, arrangement and combination of parts herein shown and described and more particularly pointed out in the claims.

Referring to the drawings in which like reference characters indicate like or corresponding parts, Figure 1 is a top plan view of a cleaning machine, showing my improvements applied thereto, Fig. 2 is a sectional view taken substantially on line 2—2 of Fig. 1, Fig. 3 is a side elevation of that portion of the machine embodying my invention, Fig. 4 is a sectional view taken substantially on line 4—4 of Fig. 3, Fig. 5 is a sectional view of a slightly modified construction, Fig. 6 is a projected view of the surface of a modified form of drum, Fig. 7 is a similar view of another modified form, Fig. 8 is a similar view of another modified form, and Fig. 9 is a similar view of another modified form.

Referring to the drawings in which is shown a machine with my improvements thereon, 1 represents the frame of the machine and 2 a rotating cylinder or drum mounted on a shaft 4 adjustably carried by suitable bearing standards 3 at each end of the drum. Adjustably carried by the standards 3 are bearing blocks 5—5, the same being slidably arranged within the standard and their upward movement controlled or limited by screws 6 on each side of the machine. The drum is preferably maintained in position by a pair of weights 7, each connected to an arm 9 pivotally secured to the frame of the machine as at 10, and coöperating with members 11 and 12 arranged under the lower part 5 in each standard 3. In this construction the drum is adjustable, the screws 6 limiting the upward movement of the drum while the weights 7 yieldingly maintain the drum in operative position, it being understood, however, that any equivalent construction may be employed. The drum 2 is rotated or driven from the driving shaft 14 through suitable gearing 15 and 16 or equivalent means.

Located above the drum 2 are a pair of scrapers 17 and 18, the same being driven from the shafts 19 and 20 or their equivalents in any suitable manner, preferably at a much greater speed than the drum 2. The scraper 17 coöperates with the drum 2 in cleaning the casings, and the scraper 18 coöperates with the scraper 17 preventing the accumulation of material upon the same. Rolls 21 and 22 are also preferably provided, the same being driven in any suitable way. As shown meshing gears 23 and 24 are arranged on the shafts through the rolls, the shaft carrying the roll 21 being provided with a gear 25 in mesh with the gear 26 on the shaft 4. The purpose of the rolls 21 and 22 is to draw the casings through the machine so that the same is automatically fed, a suitable receptacle being provided to receive the cleaned casings.

My present invention relates particularly to an improved form of drum 2 and a stationary feeding plate or drum 33.

Referring to the drawings as most clearly shown in Fig. 1, I provide a series or plurality of grooves 27 in the exterior circumferential face of the drum 2, the same being of any desired depth, and number depending upon the casings to be cleaned. In Fig. 1 the grooves are shown extending longitudinally the drum, while in Figs. 6, 7, 8 and 9 I show several modifications. In Fig. 6 the grooves 28 extend diagonally in one direction. In Fig. 7 the grooves 29 extend diagonally one way and a portion the other way. Fig. 8 shows grooves 30 and 31 extending diagonally across the face of the drum in different directions, and Fig. 9 shows the grooves 32 curved or spirally arranged. Various other modifications or combinations may be devised, depending upon the particular use to which the machine is to be put. It has been found that with the drum grooved as described the membranes are more easily loosened so that the casings are more effectively and satisfactorily cleaned. The grooved drum supports or presents the casing to the scraper in a slightly wrinkled or corrugated form, parts of the casing entering the grooves in the drum. The edges of the drum grooves coact with the scraper blades facilitating the scraping action, and the grooved drum grips the casing preventing any tendency of the casing to slip while under the action of the scraper and assisting in feeding the casing through the machine, obviating breaking of the casing between the drum and feed rolls.

As most clearly shown in Figs. 1 and 3, 33 is a non-rotatable feed drum or plate positioned at the outside and in close proximity to the end of the drum 2, the surface of the same corresponding in curvature or contour to the face of the drum. In the case where the drum is made adjustable relative to the scrapers 17 and 18 I preferably provide the non-rotatable drum part 33 so that it will adjust itself with the adjustment of the rotating drum 2. I accomplished this in a very simple manner by forming the lower part with a straight portion 34 arranged with parts 37 and 38 formed to fit on the upper part 5 at each side of the standard 3. It may be secured in position by bolts 35 passing through holes in the part 38 and engaging the upper block 5. In the construction shown the part 34 is a straight portion with a hole 36 cut out to permit the standard 5 to pass through so that the drum may be adjusted. Any equivalent means may be provided for adjustably supporting the feed drum 33 so that it will be adjustable with the rotating drum 2. In Fig. 5 I show an extended drum or feed plate 39 which may be extended on the inside or outside thereof, as shown on the outside as at 40 and secured to the frame 1 of the machine by bolts 41 or their equivalents. With this form if desired adjustability may be obtained by using a filler piece 42 of the desired thickness between the drum 39 and the frame. In case, however, where the drum 2 is not adjustable but adjustment is secured by regulating the positions of the scrapers 17 and 18 it is not necessary to have the drum 39 adjustable.

In operation assuming that the drum 2 and the scrapers 17 and 18 are rotated at the desired speeds the casings are taken by the operator and positioned by the stationary feed drum 33 and forced over between the scraper 17 and the drum 2. They are then pulled through between the drum 2 and the scraper and inserted between the rolls 21 and 22. The stationary drum or feed plate 33 facilitates feeding the casings into the machine as well as providing a safer machine for the operator, and the grooves in the drum 2 afford a more effective cleaning than with a smooth faced drum.

Having thus described my invention it is obvious that various immaterial modifications may be made in the same without departing from the spirit of my invention, hence I do not wish to be understood as limiting myself to the exact form, arrangement, construction or combination of parts herein shown, described or mentioned.

What I claim as new and desire to secure by Letters Patent is:—

1. In a casing cleaning machine, the combination of a scraper, an adjustable rotatable drum arranged adjacent the scraper for coöperation therewith, and a feed drum corresponding in contour to said rotatable drum and arranged proximate thereto at one end thereof.

2. In a casing cleaning machine, the combination of a scraper, an adjustable rotatable drum arranged adjacent thereto for coöperation therewith, and a semi-cylindrical stationary feeding plate arranged at one end of said drum and corresponding in contour therewith, said feeding plate being mounted for adjustment.

3. In a casing cleaning machine the combination of a scraper, an adjustable rotatable drum arranged to coöperate therewith and provided with grooves on the exterior thereof and a semi-cylindrical feeding plate, corresponding in contour with said drum, arranged proximate to one end thereof and adjustable therewith.

4. In a casing cleaning machine of the kind described and in combination, a frame, a rotatable drum adjustably mounted on said frame, means for adjusting the position of said drum, a plurality of scrapers and means for operating said scrapers and drum, said drum provided with a plurality of grooves on the exterior face thereof and a stationary feeding drum arranged at one end of said drum in close proximity thereto, said feed drum corresponding in curvature with the face of said drum.

5. In a casing cleaning machine, the combination of a rotatable scraper, and a rotatable drum arranged adjacent the scraper for coöperation therewith and provided with a series of grooves on its outer face extending longitudinally thereof at angles to its axis.

In testimony whereof, I have hereunto signed my name in the presence of two subscribing witnesses.

HARRY D. OPPENHEIMER.

Witnesses:
ROY W. HILL,
CHARLES I. COBB.

---

Copies of this patent may be obtained for five cents each, by addressing the "Commissioner of Patents. Washington, D. C."